US010107710B2

(12) United States Patent
Showcatally et al.

(10) Patent No.: US 10,107,710 B2
(45) Date of Patent: Oct. 23, 2018

(54) MOUNTING DEVICE FOR ACOUSTIC LEAK DETECTION SENSORS

(71) Applicant: Itron, Inc., Liberty Lake, WA (US)

(72) Inventors: Shawn Showcatally, Mankato, MN (US); Thomas Breitenfeldt, Mankato, MN (US)

(73) Assignee: Itron, Inc., Liberty Lake, WA (US)

( * ) Notice: Subject to any disclaimer, the term of this patent is extended or adjusted under 35 U.S.C. 154(b) by 78 days.

(21) Appl. No.: 15/273,460

(22) Filed: Sep. 22, 2016

(65) Prior Publication Data

US 2018/0080849 A1   Mar. 22, 2018

(51) Int. Cl.
*G01M 3/24* (2006.01)
*F16B 2/12* (2006.01)
*F16L 55/07* (2006.01)

(52) U.S. Cl.
CPC .............. *G01M 3/24* (2013.01); *F16B 2/12* (2013.01); *F16L 55/07* (2013.01); *G01M 3/243* (2013.01)

(58) Field of Classification Search
CPC ..................................................... G01M 3/24
USPC ..................................................... 73/40, 40.5
See application file for complete search history.

(56) References Cited

U.S. PATENT DOCUMENTS

| 7,007,545 | B1* | 3/2006 | Martinek | G01M 3/243 |
| | | | | 73/40.5 A |
| 2007/0131520 | A1* | 6/2007 | Saunders | B65G 21/00 |
| | | | | 198/502.1 |
| 2010/0257941 | A1* | 10/2010 | Gysling | G01F 1/667 |
| | | | | 73/861.28 |
| 2016/0084736 | A1* | 3/2016 | Schleif | F01D 17/02 |
| | | | | 73/112.01 |

OTHER PUBLICATIONS

The PCT Search Report and Written Opinion dated Dec. 22, 2017 for PCT application No. PCT/US2017/052796, 12 pages.

* cited by examiner

*Primary Examiner* — Son Le
*Assistant Examiner* — Tarun Sinha
(74) *Attorney, Agent, or Firm* — Lee & Hayes, PLLC (57) ABSTRACT

A sensor unit to detect fluid movement and/or leakage from a pipe may be attached to a mounting device that is attached to a pipe by a clamp. The mounting device may be configured to transmit vibrations from the pipe and clamp to the sensor. The sensor unit may be attached to the mount in a manner that may be performed rapidly and without tools, and which results in a connection that is not so tight as to damage the sensor, or so loose as to provide inadequate support. The sensor may be attached by connecting at least a portion of the sensor to at least a portion of the mount, using rotation of a key in a track and a latch to securely hold the sensor in the mounting device.

20 Claims, 5 Drawing Sheets

MOUNTING DEVICE FOR ACOUSTIC LEAK DETECTION SENSORS

BACKGROUND

In a utility environment, such as water and/or natural gas, sensors may be used to detect fluid flow and leakage. Attachment of such sensors to pipes can be challenging, particularly in dirty, wet, below ground and/or awkwardly confined areas. In some instances, installation technicians may require special tools, two people and/or considerable time to make the installation. Even when installed, technicians may have concerns about dirt between the sensor and pipe, possible damage to the sensor, and whether the sensor was attached too tightly or too loosely, etc. In some technologies, magnets are used to make the connection. However, magnets are inherently made of ferrous material, and are subject to oxidation, particularly in wet environments. Thus, the integrity and consistency of the connection can degrade over time. Accordingly, new and improved mounting devices are needed for use in the connection of sensors and other equipment to pipes, meters and other infrastructure.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

This disclosure describes systems, devices and method techniques for consistently and successfully mounting a component (e.g., a sensor) to infrastructure (e.g., a pipe). As noted above, known systems are prone to corrosion, shock impact (such as to dislodge unit from installation), inability to mount on plastic infrastructure, contamination and/or an inconsistent or poor acoustic pathway between pipe and sensor. These and other problems may be caused by under-tightening, over-tightening, the need for special tools, and awkward and time-consuming installation procedures. The described systems, devices and techniques overcome such problems by providing a clamp that is easily secured to a pipe and obviates the conflict between damaging a sensor by over-tightening it, or alternatively, providing a poor connection by under-tightening it. The described systems also provide a mount and sensor housing that are easily connected by a one-handed insertion of the sensor unit, and by a turn of a fraction of a full revolution, thereby removing concerns related to multiple awkward revolutions of a sensor with a full wiring harness and the need for special tools or a second technician to assist in the installation.

In one example, the disclosure describes the design and operation of a mounting system for acoustic leak-detecting sensors and the attachment of such sensors to a pipe in a water or gas utility environment. The mounting system may include a mounting unit having fastening systems including either track(s) and key(s), snap(s) and recess(es), or a mixture thereof. A sensor unit, having the complement of the track(s) and the key(s), or the snap(s) and recess(es), or the mixture, is configured for attachment to the mounting unit. In the example, insertion of the sensor unit into the mounting unit (or the reverse) and rotation of the sensor with respect to the mounting unit moves the key within the track. Movement of the key within the track tightens a connection between the mounting unit and the sensor unit. The mounting unit may additionally include either latch(es), recess(es) or a mixture thereof, and the sensor unit may have the complement of latch(es), recess(es) or the mixture. When the key reaches a prescribed location in the track the latch(es) snap into the recess(es), thereby locking the sensor onto the mount. The recess(es) may be the track(s) themselves or recess(es) dedicated to receive the latch(es). In one embodiment of the design, the latch may make an audible (e.g., clicking) sound as it snaps into a complementary recess. The sound makes the technician aware that a preferred installation condition has been achieved (e.g., that the sensor is properly tightened and that the installation is complete). In a further embodiment of the design, a tactile notification is provided to the installation technician, indicating that the preferred installation conditions have been achieved.

Example System and Techniques

Figure 1:
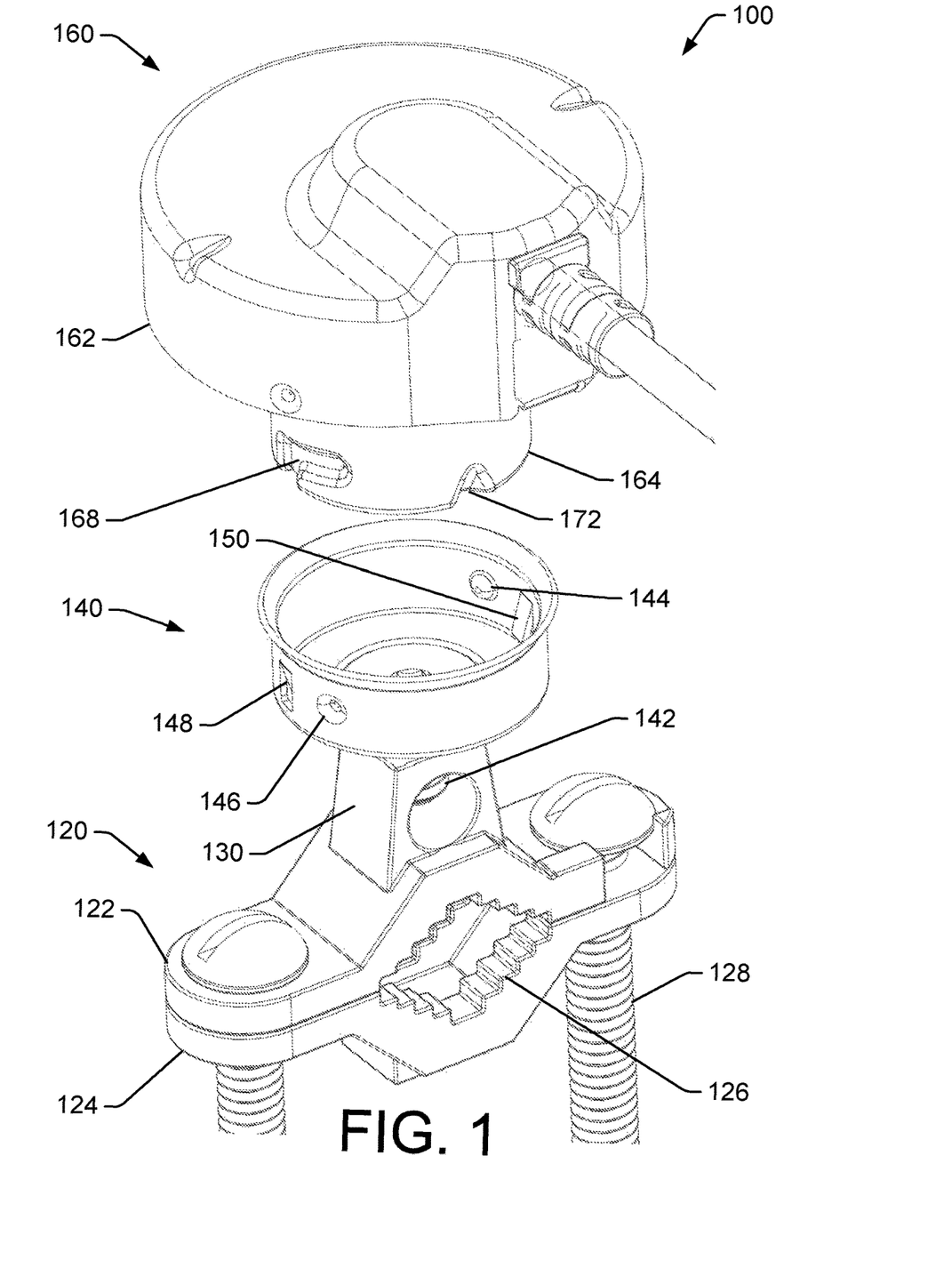
FIG. 1 is an exploded isometric view of an example sensor in a position to be attached to an example mount that has been attached to a clamp that could be attached to a pipe (not shown).

FIG. 1 shows an example sensor mounting system 100. In the example system 100, a clamp 120 may be attached to a pipe (shown in FIGS. 2 and 4). The clamp 120 provides a solid connection with the pipe, and does not include sensitive electronics that could be damaged if the installation is difficult to perform. A mount 140 is configured for attachment to the clamp 120, and provides fastening structures that allow installation of a sensor in a manner that provides a secure mechanical and acoustic connection. The sensor 160 is configured for installation by a technician in a manner that is quick, easy and repeatable, and is less likely to result in sensor damage (such as by over-tightening) and/or a poor acoustic connection (such as by under-tightening). In several examples, the sensor 160 is attached to the mount 140 by using a prescribed degree of rotary motion that may be less than 360 degrees, and may also be less than 90 degrees. Advantageously, such rotation does not result in the need to move a wiring harnesses in concert with multiple revolutions of the sensor, which can be difficult in a tight space, an underground location and/or a muddy environment.

The example clamp 120 shown includes an upper clamp 122 and a lower clamp 124 that form a jaw 126 that may be tightened onto a pipe using bolts 128. The clamp 120 includes a fastening structure, such as a threaded socket 130, to allow attachment of the mount 140. The threaded socket 130 is configured to receive a bolt passing through the mount 140, and to thereby form a mechanical connection between the clamp and the mount 140. In addition to providing a mechanical connection to the pipe, the clamp 120 and the mount 140 (particularly the bolt 142 passing through the mount) transfer vibration of the pipe and fluids contained within the pipe, to the sensor 160.

Figure 4:
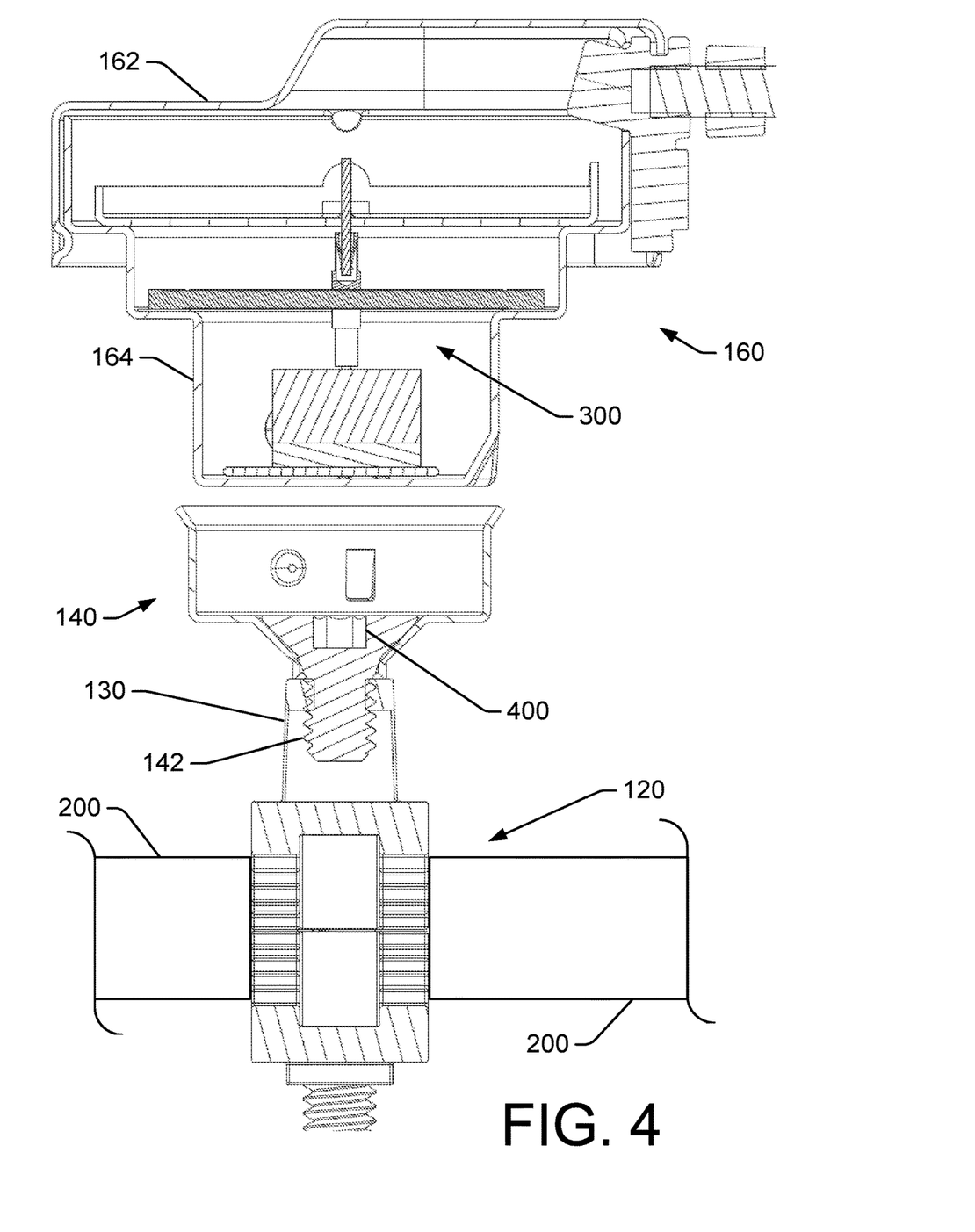
FIG. 4 is an orthographic cross-sectional view of an example sensor, the sensor being in position to attach to an example mount, the mount being attached to an example clamp, which is attached to a pipe.

The example mount 140 is shown attached to the clamp 120 by a bolt 142. A lower portion of the bolt is shown in FIG. 1, and a cross-sectional view of the bolt is seen in FIG. 4. The mount 140 includes a hollow cylindrical portion having an inside diameter that is larger than an outside diameter of a lower portion of the sensor 160, allowing the mount 140 to receive the sensor 160.

In the example sensor mounting system 100, one or more fastening systems may be used to connect the sensor 160 to the mount 140. In a first example fastening system, the mount 140 includes one or more keys that guide, grasp and secure the sensor 160. A protruding or convex front portion of a first key 144 and a concave rear portion of a second key 146 are shown on opposite sides of the mount. The keys 144, 146 are configured for travel within corresponding tracks defined on the lower portion of the sensor 160.

In some embodiments of the sensor mounting system 100, an alternative or additional fastening system may be utilized. In an example of such a fastening system, a first latch 148 and a second latch 150 are each configured, such as of a resiliently deformable material, to snap into respective recesses defined in the housing of the sensor. In an example, each latch is a flexible tab that is biased toward engagement with a track or recess. Once the latches 148, 150 of the mount 140 have snapped into a respective recess defined in the housing of the sensor 160, the mount and sensor are effectively locked together so that the sensor cannot be inadvertently unthreaded from the mount. This ensures that the connection of the sensor 160 to the mount 140 is secure and will not degrade over time. This also ensures that the sensor has not been over-tightened or under-tightened with respect to the mount. In an example, the latches 148, 150 may snap into a recess when the keys 144, 146 have traveled an appropriate distance within the tracks (or when the sensor housing has been rotated a threshold angle relative to the mount). In a further example, the latches 148, 150 may be configured to snap into a recess defined by the track within which the keys travel. In another example, a dedicated recess separate from the track may be defined on the sensor housing.

In the example of FIG. 1, the sensor 160 is configured with an upper sensor housing 162 and a lower sensor housing 164. The lower sensor housing 164 may define one or more tracks 168 configured for travel by the keys 144, 146 of the mount 140. By aligning the keys 144, 146 with respective tracks 168 (and a second track not shown), the sensor unit 160 may be inserted into the mount and turned. Turning the sensor unit 160 will tighten the unit within the mount 140. Accordingly, the track 168 is configured to spiral around an exterior surface of the lower sensor housing 164. By following the spiral, the key will tend to tighten a connection between the sensor 160 and the mount 140.

Note that while the tracks 168 are shown defined in an exterior or exterior surface of the lower sensor housing 164, and the keys 144, 146 are shown defined on an interior or interior surface of the mount 140, one or more of the tracks and keys could be reversed and located on the other of the mount and the sensor housing. Also, while the latches are shown as located on the mount, and the recesses (and/or tracks) are shown as being located on the sensor, in other examples one or more latch and recess pair could be oppositely located (i.e., latch on sensor and recess on mount).

Figure 2:
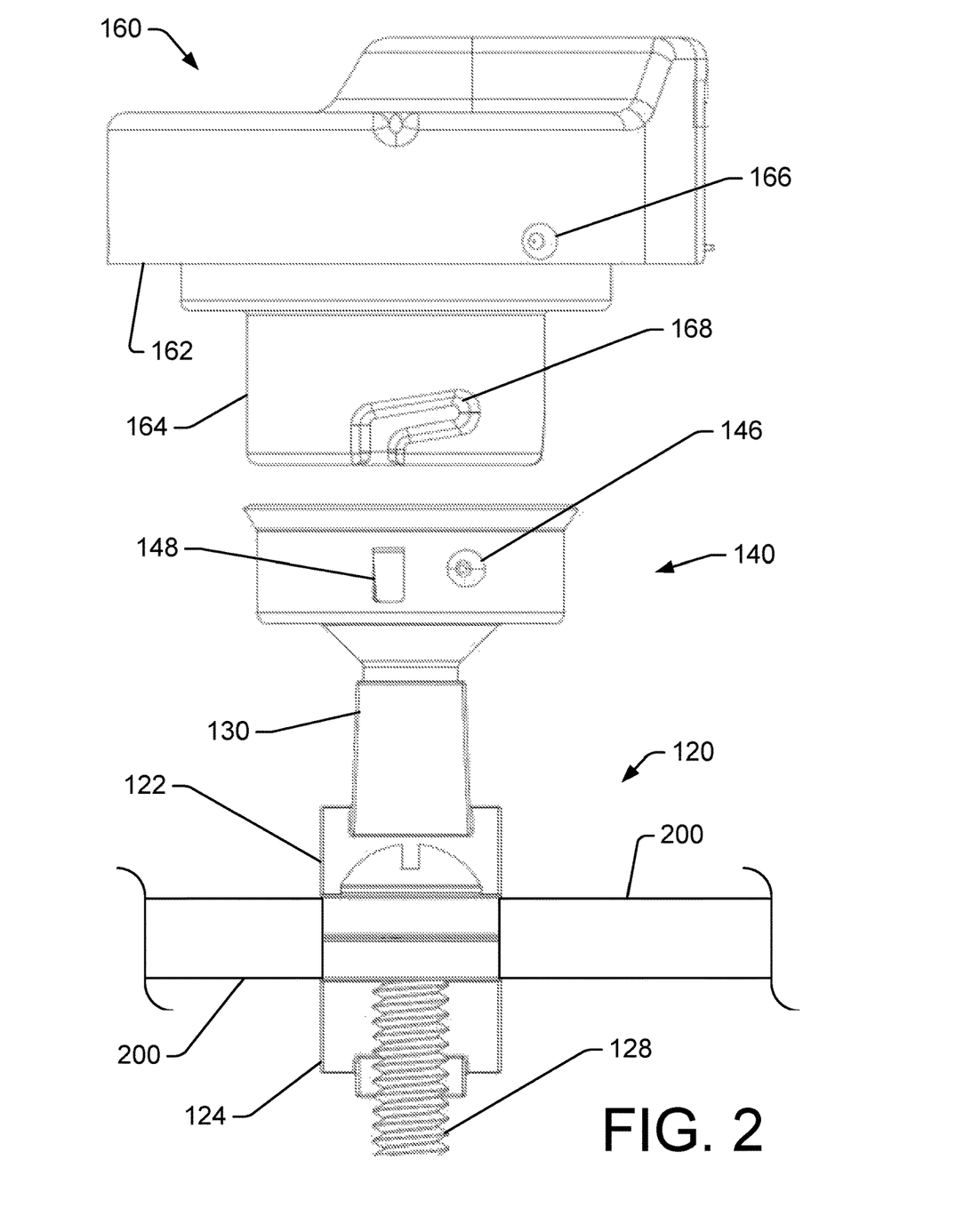
FIG. 2 is an exploded orthographic view of an example sensor in a position to be attached to an example mount that has been attached to a clamp, which in turn is attached to a pipe.

FIG. 2 shows an example sensor 160 in a position to be attached to an example mount 140 that has been attached to a clamp 120, which in turn is attached to a pipe 200. In the view of the sensor 160 shown, the upper sensor housing 162 and the lower sensor housing 164 are assembled and held in place by fastening dimple 166. The track 168 is defined in the lower sensor housing 164, and is ready to engage the key 146 of the mount 140 upon slight rotation. Once the key 146 is engaged with the track 168, the sensor 160 will rotate within the mount for a predetermined distance, which may be less than 360 degrees, and in the example shown, for less than 90 degrees.

In the view of the mount 140 shown, the key 146 is slightly out of alignment with respect to the track 168 defined in the lower housing 164 of the sensor 160. The first latch 148 is oriented with respect to the key 146 so that when the key 146 reaches a predetermined position on the track 168 (e.g., the end of the track), the latch 148 will snap into the track 168, thereby locking the sensor 160 into the mount 140. In this locked position, the sensor unit 160 may be pressed against and securely contacting the receptacle of the mount 140. The bolt (not shown) of the mount 140 has been threaded into the socket 130 of the clamp 120, thereby securing the mount with respect to the pipe 200. This arrangement ensures a good acoustic transmission path between the pipe and the sensor.

In the view of the clamp 120 shown, the upper and lower clamps 122, 124 are on the top and bottom of pipe 200. One bolt 128 is shown, of the two bolts that will lock the clamp halves 122, 124 into place. The threaded socket 130 has received the bolt (not shown) of the mount 140.

Figure 3:
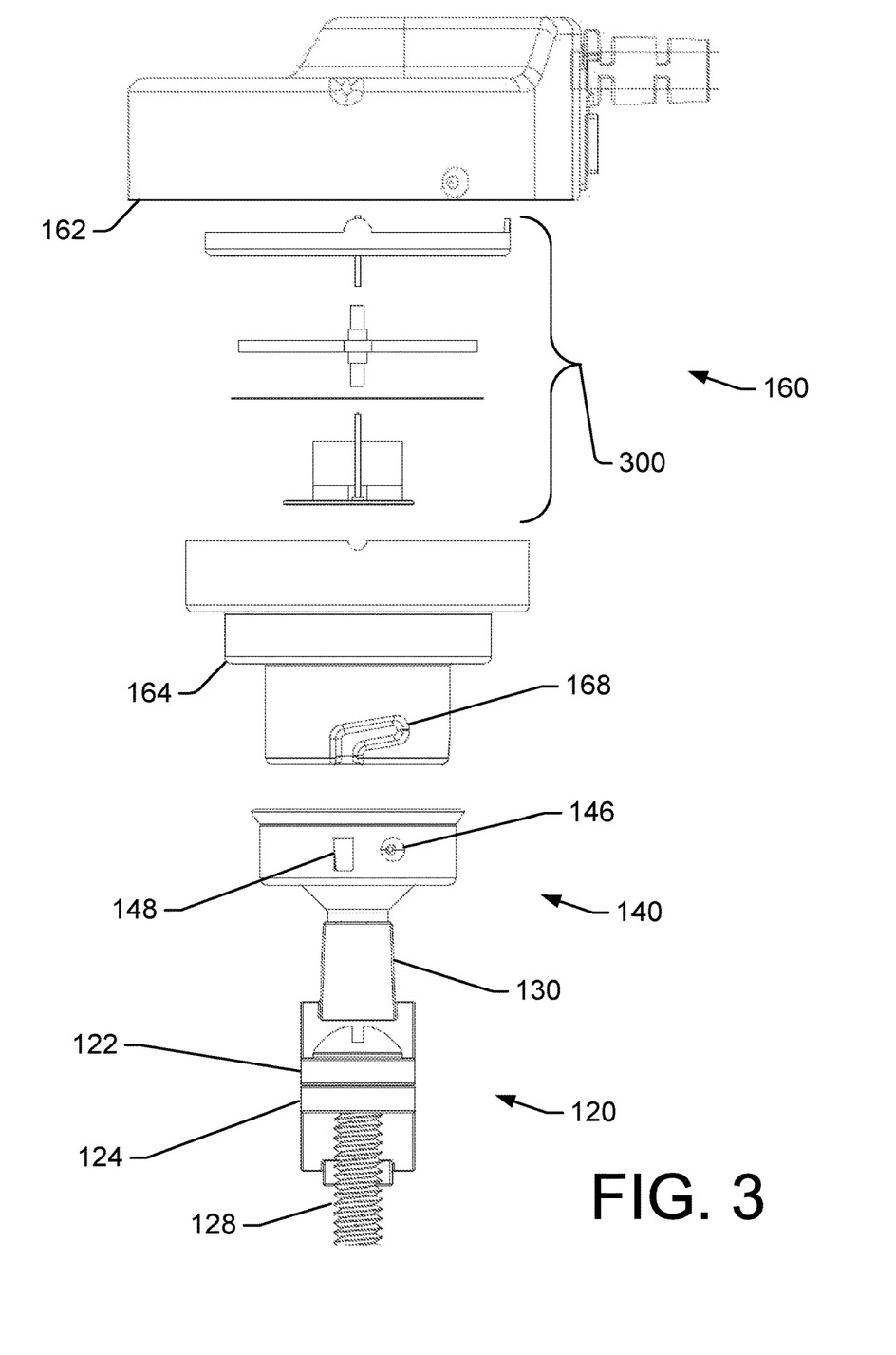
FIG. 3 is an exploded orthographic view, showing examples of an upper sensor housing, internal sensor components, a lower sensor housing, a mount and a clamp for attachment to a pipe (not shown). The view also shows an example key-and-track fastener and an example latch fastening mechanism.

FIG. 3 shows examples of the sensor 160 in an exploded view, wherein the upper housing 162 is separated from the lower housing 164. Example electromechanical sensor components 300 are shown in the exploded view.

The track 168, configured to engage, and allow travel of, the key 146, is shown. Additionally, one or more similar tracks may be present on other sides of the lower sensor housing 164, but are not shown in this view. Tracks can be on either of the mount and the sensor housing, and corresponding keys can be on the opposite component.

The mount 140 is shown attached to the clamp 120. In particular, the bolt 142 (not seen in FIG. 3, but shown in FIGS. 1 and 4) is threaded into the socket 130 of the clamp 120. The key 146 and latch 148 are configured to travel within, and to snap into, respectively, the track 168 of the lower sensor housing 164.

The clamp 120, configured to attach to a pipe and to the mount, is shown without the pipe (which is seen in FIGS. 2 and 4). The upper and lower clamp halves 122, 124 are sized according to a pipe present in the particular application. The bolt 128 (and a similar bolt on the other side) are sized to attach the clamp halves 122, 124 to the pipe.

FIG. 4 is an orthographic cross-sectional view of an example sensor 160, in position to attach to an example mount 140, which is attached to an example clamp 120 that is attached to a pipe 200. The upper and lower sensor housings 162, 164 enclose the sensor components 300. The bolt 142 passes through the mount 140 and is attached to the threaded socket 130 of the clamp 120. As a result of this attachment, the clamp, bolt and mount are able to transfer vibrations from the pipe to the sensor 160. In the example shown, the bolt 142 is tightened by a hex socket 400, or similar.

While the bracket 120 and the mount 140 are shown as two separate components, they could alternatively be constructed as single component, either using fastening structures or according to a single uniform, cohesive, solid or integrated design.

Methods of Operation

Figure 5:
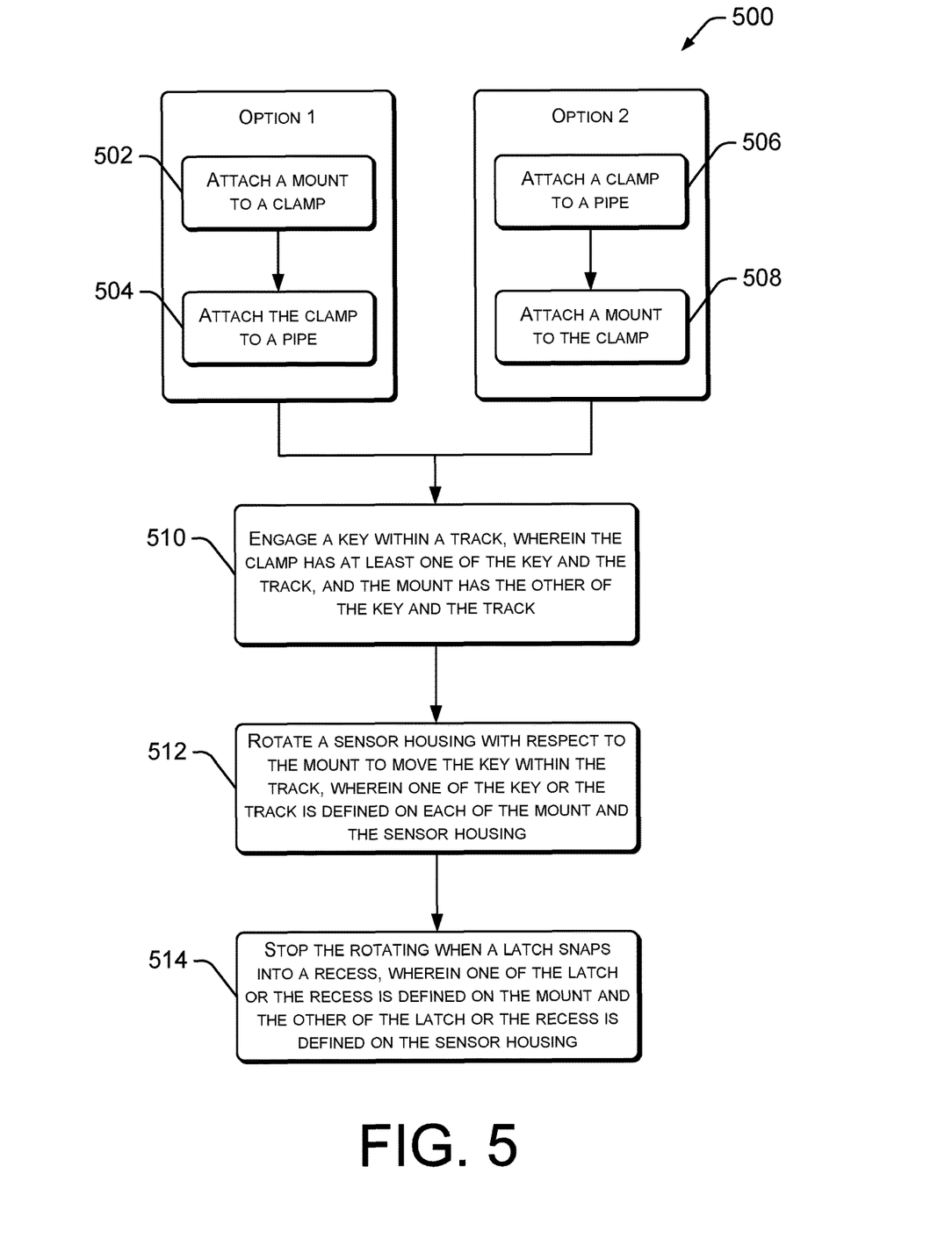
FIG. 5 is a flow diagram describing an example installation of a clamp, a mount and a sensor to a pipe in a water, gas or other environment.

FIG. 5 is a flow diagram showing an example process 500, which is representative of techniques by which a sensor unit may be attached to a pipe. In a first example, the clamp and mount may have been previously combined into a single component that is attached to a pipe, and a sensor unit is then attached to the mount. In a second example, a clamp may be attached to a pipe, a mount is then attached to the clamp, and a sensor unit is then attached to the mount. Versions of the process 500 may, but need not necessarily, be implemented in whole or in part by the system 100 described with respect to FIGS. 1-4.

At block 502 of option 1 (or block 508 of option 2) a mount is attached to a clamp. The actions of block 502 may be performed at a factory (e.g., option 1), wherein a clamp/mount component is assembled. Alternatively, the actions of block 508 may be performed in the field (e.g., option 2), by an installation technician. Accordingly, the actions of options 1 and 2 are performed in the reverse order. The example of FIG. 3 shows detail regarding how the clamp 120 supports the mount 140. In particular, the threaded socket 130 of the clamp 120 allows a threaded fastener to be used to connect the mount 140 to the clamp 120. In the example of FIG. 4, the threaded fastener is shown as a bolt 142, and is used to attach the mount 140 to the clamp 120. When attached, the mount 140 provides at least portions of a fastener that may be used to rapidly attach a sensor 160, without risk of damage or question of under/over tightening. Additionally, the threaded fastener or bolt 142 or other portions of the mount 140 may provide acoustic transference from the clamp 120, through the mount, and to the sensor 160.

At block 504 of option 1 (block 506 of option 2) a clamp is attached to a pipe. Where option 1 was followed, block 504 results in attachment of a clamp and a mount to a pipe. Where option 2 is followed, block 506 positions the clamp on the pipe, where it will receive the mount in the action of block 508. Thus, the clamp may or may not have a mount at the time of attachment to the pipe.

When both components are attached to the pipe (by either of option 1 or option 2), the clamp and mount form a strong mechanical and acoustic connection with the pipe. FIG. 1 shows an example of such a clamp 120 and mount 140, which can be seen attached to a pipe in FIGS. 2 and 4. In particular, clamp halves 122, 124, U-bolts, hose clamps or other fasteners may be used to attach the clamp 120 to the pipe 200. The pipe may be metal or plastic, and may carry water, natural gas or other consumable fluid. Additionally, the pipe may be above ground or below ground. Accordingly, the clamp may be selected based on conditions in the particular application. FIG. 1 shows a view of the jaws 126 of the clamp 120, while FIG. 2 shows the clamp attached to a pipe.

At block 510, at least one key is engaged within a corresponding track, wherein the clamp has at least one of a key and a track, and the mount has the other of the key and the track. FIG. 3 shows an example mount 140 having a key 146 sized to travel within a track 168 defined in the lower sensor housing 164. While the key was shown as defined on the mount, and the track as defined on the sensor housing, the reverse could be true. Also, each of the mount and sensor could have a key and a track, which would correspond to the track and the key of the other. And further, other combinations of keys and tracks—e.g., set at 120 degrees—are also possible.

At block 512, a sensor housing is rotated with respect to the mount to move the key within the track, wherein one of the key or the track is defined on each of the mount and the sensor housing. While FIG. 3 shows an example mount 140 having a key 146 sized to travel within a track 168 defined in the lower sensor housing 164, the key could be defined on the lower sensor housing, and the track could be defined on a surface of the mount. Also, while the sensor is shown configured for insertion into the mount 140, the reverse could be true if the sensor provided a socket sized to accept the mount 140. Such an alternative arrangement would also provide rapid installation and not involve multiple revolutions as one component is attached to the other component.

At block 514, the rotating of the sensor with respect to the mount is stopped when a latch snaps into a recess. In an example, one of the latch or the recess may be defined on the mount and the other of the latch or the recess may be defined on the sensor housing. FIG. 2 shows that a latch 148 is configured to snap into the track 168 when the lower sensor housing 164 has rotated to a point wherein the key 146 has traveled a predesigned or predesignated distance along the track 168. While the latch 148 shown is configured to snap into the track 168, a different recess could be used, separate from the track. The latch 148 may be made of resiliently deformable plastic or other material, which is under some bias and/or tension that moves the latch into the track or other recess upon alignment of latch and the track or recess.

Additional Example Embodiments

An example system comprises a mount, having one of a track or a key; and a sensor, having the other of the track or the key, wherein the sensor comprises an acoustic leak detection sensor; wherein the key is sized to be received by and travel within the track, wherein rotation of the sensor with respect to the mount moves the key within the track, and wherein movement of the key within the track tightens a connection between the mount and the sensor.

In an optional variation of the system, the mount additionally comprises one of a latch or a recess; the sensor additionally comprises the other of the latch or the recess; and the latch snaps into the recess upon a prescribed degree of rotation of the sensor with respect to the mount.

In an optional variation of the system, the recess is the track; and the latch is configured to snap into the track; and contact between the latch and the track is made after rotation of the sensor with respect to the mount is of the prescribed degree of rotation.

In an optional variation of the system, the latch comprises a flexible tab that is biased toward engagement with the track.

In an optional variation of the system, the track is defined in an exterior of a housing of the sensor; and the key is configured as a dimple defined in the mount.

In an optional variation of the system, the track is defined on an exterior surface of the mount and partially spirals about the exterior surface of the mount.

In an optional variation of the system, the mount comprises an inside diameter greater than an outside diameter of a lower portion of the sensor; the track is defined in an outside surface of a lower portion of a housing of the sensor; and the key is defined in an inside surface of the mount.

An optional variation of the system additionally comprises a clamp to couple to the mount.

A second example system comprises a mount having one of a latch and a recess; and a sensor, having the other of the latch or the recess, wherein the sensor comprises an acoustic leak detection sensor; wherein the latch snaps into the recess upon a prescribed positioning of the sensor with respect to the mount.

In an optional variation of the second system, the mount additionally comprises one of a track or a key; the sensor additionally comprises the other of the track or the key; and the latch snaps into the recess upon a prescribed degree of rotation of the sensor with respect to the mount.

In an optional variation of the second system, the recess is the track; the latch is configured to snap into the track; and a connection between the latch and the track is made after movement of the sensor to a prescribed location with respect to the mount.

In an optional variation of the second system, the track is defined in an exterior of a housing of the sensor; and the key is configured as a dimple defined in the mount.

In an optional variation of the second system, the mount comprises an inside diameter greater than an outside diameter of a lower portion of the sensor; the track is defined in an outside surface of a lower portion of a housing of the sensor; and the key is defined on an inside surface of the mount.

An optional variation of the second system additionally comprises a clamp to couple to the mount.

Additional Example Methods of Operation

In an example method of attaching a sensor device to a pipe, comprises attaching a clamp and a mount to a pipe; engaging a key within a track, wherein the clamp has at least one of the key and the track, and the mount has the other of the key and the track; rotating a sensor housing with respect to the mount to move the key within the track, wherein at least one of the key or the track is defined on each of the mount and the sensor housing; and stopping the rotating when a latch snaps into a recess, wherein one of the latch or the recess is defined on the mount and the other of the latch or the recess is defined on the sensor housing.

In an optional variation of the method, the recess comprises a portion of the track, and the track is defined on the sensor housing.

In an optional variation of the method, attaching the clamp to the pipe comprises connecting the clamp to the pipe with a clamp.

In an optional variation of the method, attaching the mount to the clamp comprises fastening the mount to the clamp with a threaded fastener sized to fit within a cavity defined by the mount; and advancing the threaded fastener to form a secure connection to the clamp to allow transfer vibrations of the pipe, or fluids within the pipe, to a sensor device within the sensor housing.

In an optional variation of the method, engaging the key within the track comprises rotating the sensor housing with respect to the mount until the key is adjacent to the track; advancing the key into the track; and rotating the sensor housing with respect to the mount to advance the sensor housing into the mount and into contact with a bolt holding the mount to the clamp.

In an optional variation of the method, the stopping the rotating comprises rotating the sensor housing until a sound is made by the latch snapping into the recess.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A system, comprising:
a clamp to attach to a pipe;
a mount, wherein the mount has one of a track or a key;
a fastener to connect the mount to the clamp and to transmit vibration from the pipe to an acoustic sensor;
a sensor housing, having the other of the track or the key, wherein the key is sized to be received by and travel within the track, and wherein rotation of the sensor housing with respect to the mount moves the key within the track; and
an acoustic sensor located within the sensor housing;
wherein movement of the key within the track contacts the sensor housing against the fastener.

2. The system of claim 1, wherein:
the mount additionally comprises one of a latch or a recess;
the sensor housing additionally comprises the other of the latch or the recess; and
the latch snaps into the recess upon a prescribed degree of rotation of the sensor housing with respect to the mount.

3. The system of claim 2, wherein:
the recess is the track; and
the latch is configured to snap into the track; and
contact between the latch and the track is made after rotation of the sensor housing with respect to the mount is of the prescribed degree of rotation.

4. The system of claim 2, wherein the latch comprises a flexible tab that is biased toward engagement with the track.

5. The system of claim 1, wherein:
the track is defined in an exterior of the sensor housing; and
the key is configured as a dimple defined in the mount.

6. The system of claim 1, wherein the track is defined on an exterior surface of the mount and partially spirals about the exterior surface of the mount.

7. The system of claim 1, wherein:
the mount comprises an inside diameter greater than an outside diameter of a lower portion of the sensor housing;
the track is defined in an outside surface of a lower portion of the sensor housing; and
the key is defined in an inside surface of the mount.

8. A system, comprising:
a mount having one of a latch or a recess;
a bolt to connect the mount to a clamp and to vibrate an acoustic leak detection sensor responsive to vibration of a pipe; and
a sensor housing, having the other of the latch or the recess, wherein the sensor housing contains the acoustic leak detection sensor, and wherein rotation of the sensor housing with respect to the mount advances the sensor housing into the mount and advances the sensor housing into contact with the bolt connecting the mount to the clamp;

wherein the latch snaps into the recess upon a prescribed positioning of the sensor housing with respect to the mount.

9. The system of claim 8, wherein:
the mount additionally comprises one of a track or a key;
the sensor housing additionally comprises the other of the track or the key; and
the latch snaps into the recess upon a prescribed degree of rotation of the sensor housing with respect to the mount.

10. The system of claim 9, wherein:
the recess is the track;
the latch is configured to snap into the track; and
a connection between the latch and the track is made after movement of the sensor housing to a prescribed location with respect to the mount.

11. The system of claim 9, wherein:
the track is defined in an exterior of the sensor housing; and
the key is configured as a dimple defined in the mount.

12. The system of claim 9, wherein:
the mount comprises an inside diameter greater than an outside diameter of a lower portion of the sensor;
the track is defined in an outside surface of a lower portion of the sensor housing; and
the key is defined on an inside surface of the mount.

13. The system of claim 9, additionally comprising a clamp to attach to the pipe and to couple to the mount.

14. A method of attaching a sensor device to a pipe, comprising:
attaching a clamp to a pipe;
attaching a mount to the clamp with a fastener;
attaching a sensor housing to the mount by engaging a key within a track, wherein the sensor housing has at least one of the key and the track, and the mount has the other of the key and the track;
rotating the sensor housing with respect to the mount by moving the key within the track, wherein rotating the sensor housing advances the sensor housing into the mount and into contact with the fastener connecting the mount to the clamp; and
stopping the rotating when a latch snaps into a recess, wherein one of the latch or the recess is defined on the mount and the other of the latch or the recess is defined on the sensor housing.

15. The method of claim 14, wherein the recess comprises a portion of the track, and wherein the track is defined on the sensor housing.

16. The method of claim 14, wherein attaching the clamp to the pipe comprises connecting the clamp to the pipe with an upper clamp and a lower clamp.

17. The method of claim 14, wherein:
rotating the sensor housing comprises rotating the sensor housing with respect to the mount to advance the sensor housing into the mount and into contact with the fastener;
attaching the mount to the clamp comprises installing a threaded bolt sized to fit within a cavity defined by the mount; and
advancing the threaded bolt to form a secure connection between the threaded bolt and the clamp that transfers vibrations of the pipe to a sensor device within the sensor housing.

18. The method of claim 14, wherein rotating the sensor housing with respect to the mount additionally comprises:
rotating the sensor housing with respect to the mount until the key is adjacent to the track; and
advancing the key into the track.

19. The method of claim 14, wherein the stopping the rotating comprises rotating the sensor housing until a sound is made by the latch snapping into the recess.

20. The system of claim 1, wherein the fastener is a bolt.

* * * * *